W. S. LYCAN.
WATER TUBE BOILER.
APPLICATION FILED FEB. 26, 1908.

945,130.

Patented Jan. 4, 1910.
3 SHEETS—SHEET 3.

WITNESSES
J. A. Brophy
Theo. G. Hoster

INVENTOR
William S. Lycan
BY Munn & Co
ATTORNEYS

UNITED STATES PATENT OFFICE.

WILLIAM SHIELDS LYCAN, OF MARSHALL, ILLINOIS.

WATER-TUBE BOILER.

945,130.  Specification of Letters Patent.  Patented Jan. 4, 1910.

Application filed February 26, 1908. Serial No. 417,935.

*To all whom it may concern:*

Be it known that I, WILLIAM S. LYCAN, a citizen of the United States, and a resident of Marshall, in the county of Clark and State of Illinois, have invented a new and Improved Water-Tube Boiler, of which the following is a full, clear, and exact description.

The object of the invention is to provide a new and improved water tube boiler, which is simple, durable and compact in construction, designed for use in generating steam for motive power or for heating buildings by steam or hot water, and arranged to provide an exceedingly large heating surface and to use the fuel economically and to the fullest advantage.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 1:
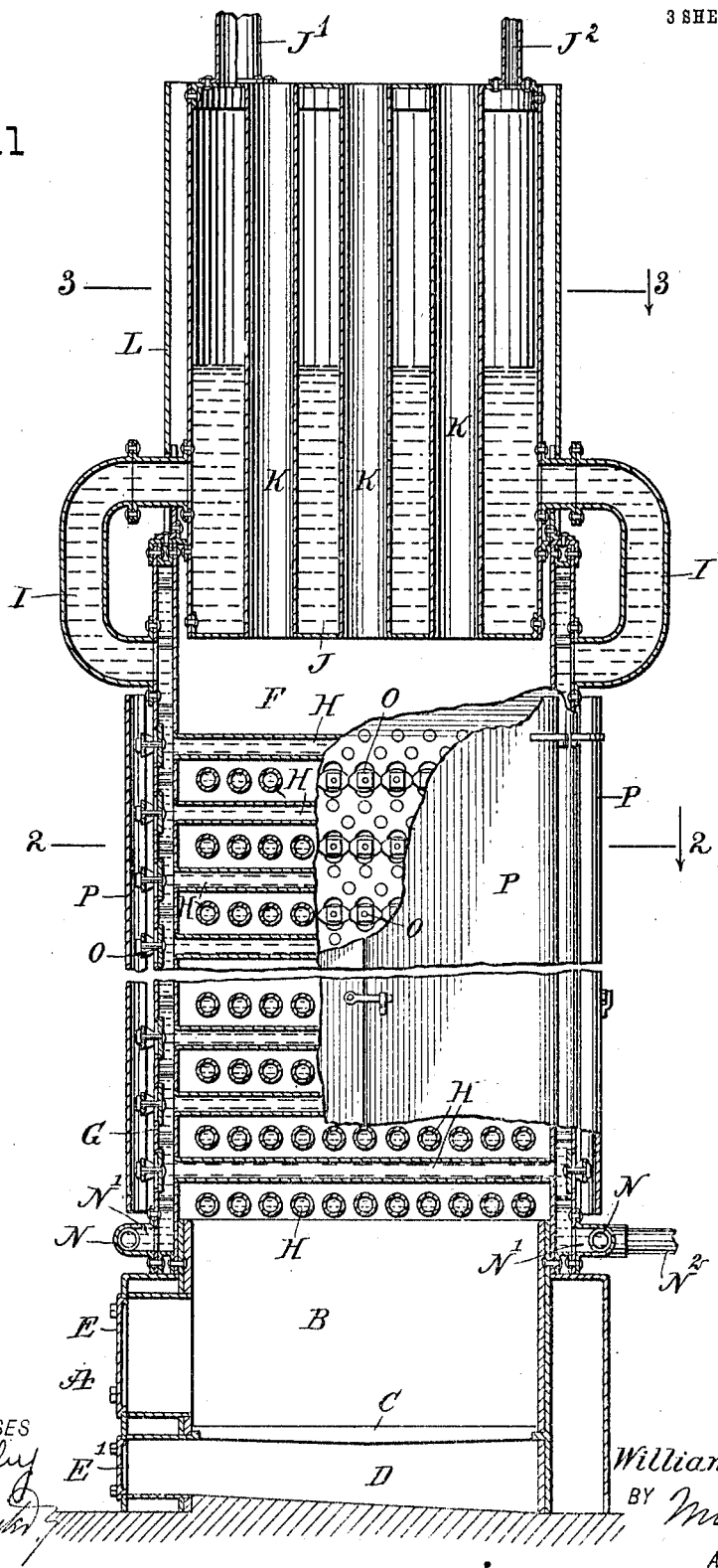
Figure 2:
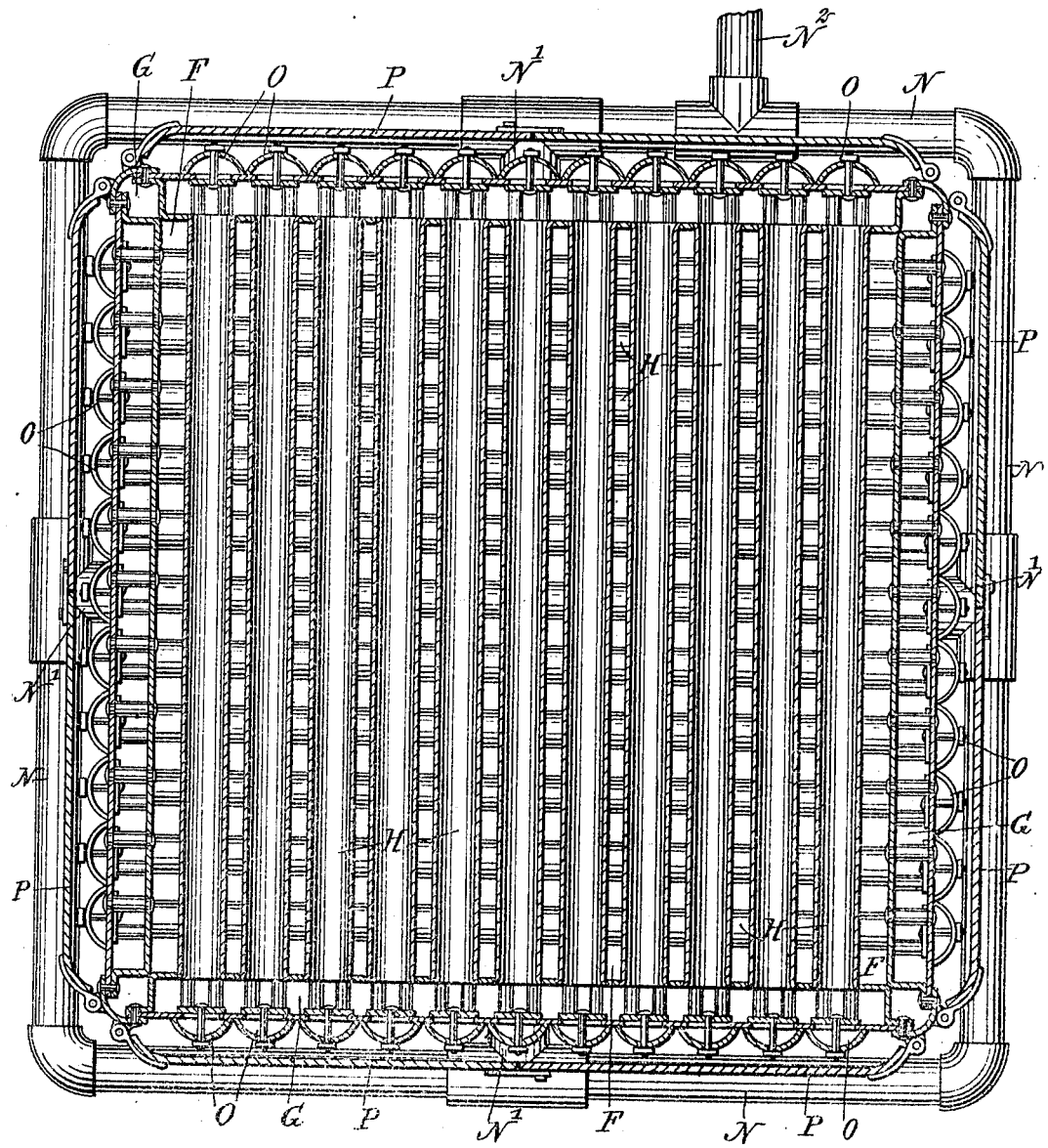
Figure 3:
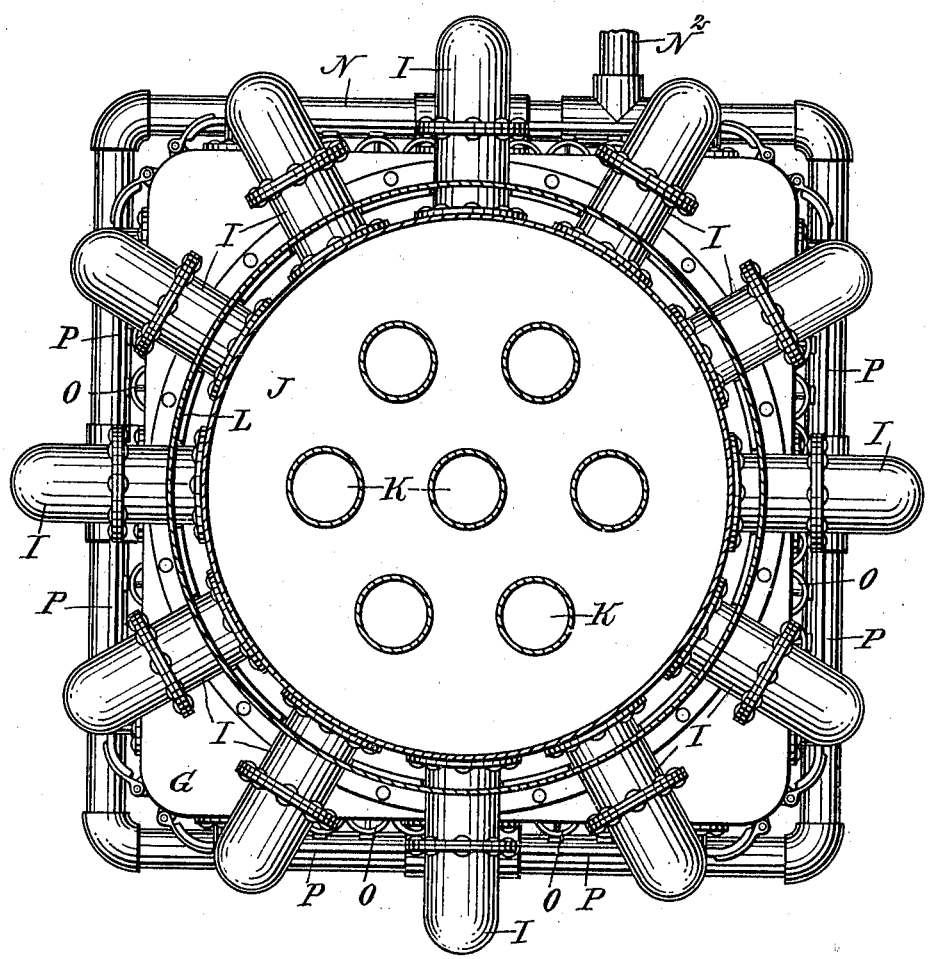

Figure 1 is a transverse section of the improvement; Fig. 2 is an enlarged sectional plan view of the same on the line 2—2 of Fig. 1, and Fig. 3 is a similar view of the same on the line 3—3 of Fig. 1.

The furnace A is set on a suitable foundation and is provided with a fire box B having a grate C, below which is the ash pit D, access to the fire box B and ash pit D being had by suitable doors E and E′, as plainly indicated in Fig. 1.

On the furnace A is set a combustion chamber F, into the lower end of which opens the upper end of the fire box B, and the said combustion chamber F is preferably made square or rectangular and is surrounded by a correspondingly shaped water chamber G. Water tubes H extend across the combustion chamber F and open at their ends into the water chamber G, the said water tubes H being arranged in tiers and the tubes in successive tiers being disposed at right angles to each other, as plainly illustrated in Figs. 1 and 2. By the arrangement described a very large number of water tubes H are arranged in a comparatively small space, and the smoke and gases arising from the burning fuel in the fire box B pass up through the combustion chamber F and around all the water tubes H contained therein, so that the heat of the smoke and gases is utilized to the fullest advantage and a quick heating of the water circulating through the water tubes H and the water chamber G is obtained.

The water chamber G is connected near its upper end by a series of connecting pipes I with the steam dome J attached to the upper end of the water chamber G and extending with its lower portion into the upper end of the combustion chamber F, as plainly shown in Fig. 1, and through the said steam dome J extend the smoke flues K in a vertical direction, to allow a portion of the smoke and gases in the upper end of the combustion chamber F to pass through the said smoke flues K, with a view to heat the water therein and also the steam, to form superheated steam. The steam dome J is preferably made tubular and is surrounded by a shell L forming an annular space with the steam dome J, for the passage of part of the smoke and gases from the upper end of the combustion chamber F. The upper end of the shell L may be connected with a chimney or other means for carrying off the smoke and gases. Now by the use of the connecting pipes I, water in the upper end of the water chamber G can circulate into the steam dome J, to be heated by the smoke and gases passing through the pipes K and those passing up in the space between the shell L and the steam dome J. The steam in the steam dome J can be carried off through a suitable pipe J′ to its destination, and a pipe $J^2$ connects the water column, water glass, gage cock and steam gage, to be connected with the boiler below the water line.

The feed water is supplied to the lower end of the water chamber G by a pipe N surrounding the water chamber G and connected with the same by branch pipes N′, the pipe N being connected by a pipe $N^2$ with a suitable water supply.

In order to permit cleaning of the water tubes H, the outer wall of the water chamber G is provided with hand holes O, one at each end of a tube H, to allow convenient access to each tube for cleaning the same whenever it is deemed necessary to do so. In order to prevent undue radiation of heat from the water chamber G, doors P of asbestos or other suitable non-heat conducting material are provided, the said doors P also covering the hand holes O, as plainly shown in the drawings.

From the foregoing it will be seen that the water tube boiler shown and described is very simple and compact in construction, and provides an exceedingly large heating surface and utilizes the fuel burned in the fire box B economically and to the fullest advantage. By providing the doors P and hand holes O, undue radiation of heat is prevented and the water tubes H can be kept in clean condition.

Having thus described my invention, I claim as new and desire to secure by Letters Patent:

1. A water tube boiler, comprising a furnace, a combustion chamber rising from the fire box of the furnace, a water chamber surrounding the said combustion chamber, tiers of water tubes extending across the said combustion chamber and opening at their ends into the said water chamber, a water supply connected with said water chamber, a drum forming a water chamber and a steam dome, the said drum extending into the upper end of the combustion chamber, smoke flues extending vertically through the said drum, and a series of pipes connected at their lower ends with the upper part of the said first mentioned water chamber, the upper ends of said pipes being connected with the said drum above the bottom thereof whereby the water is caused to circulate in the said drum.

2. A water tube boiler comprising a furnace, a combustion chamber rising from the fire box of the furnace, a water chamber surrounding the said combustion chamber, tiers of water tubes extending across the said combustion chamber and opening at their ends into the said water chamber, a water supply connected with the lower end of said water chamber, a drum forming a boiler and steam dome, the said drum extending into the upper end of said combustion chamber and spaced therefrom, a shell surrounding the said drum and spaced therefrom to form an annular passage communicating with the combustion chamber for the escape of smoke and gases therefrom, a series of pipes connecting the upper part of the water chamber with the lower part of said drum above the bottom of the latter, whereby the water has free circulation in the drum, and smoke flues extending vertically through the said drum.

3. In a water tube boiler, the combination with a combustion chamber, a water chamber surrounding the combustion chamber, and water tubes in the combustion chamber connected with the water chamber, of a drum extending into the upper end of the combustion chamber, a series of curved pipes arranged in a circle and connecting the upper end of the said water chamber with the said drum above the bottom of the latter, the upper part of said drum forming a steam dome and the lower part of the drum and the said pipes containing water, thereby increasing the capacity of the boiler, smoke flues extending through the drum, and a shell surrounding the drum and spaced therefrom to form an annular passage communicating with the combustion chamber, the smoke and gases passing through said flues and said annular space heating the water in said drum.

In testimony whereof I have signed my name to this specification in the presence of two subscribing witnesses.

WILLIAM SHIELDS LYCAN.

Witnesses:
ERNEST ADAMS,
ROBERT PREWETT.